March 12, 1963
A. G. NERHEIM
3,080,746
APPARATUS AND METHOD FOR TESTING LIQUIDS
Filed Oct. 27, 1959
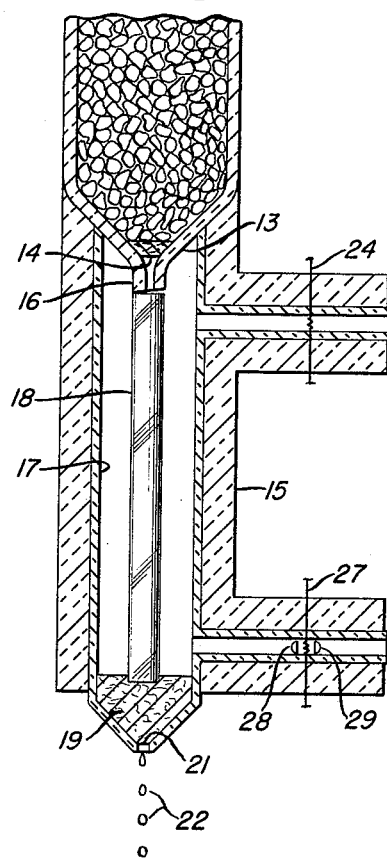
Fig. 1
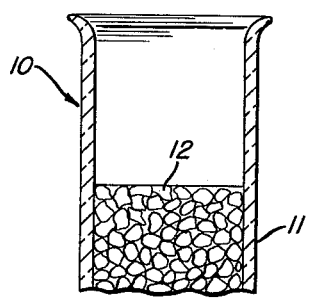
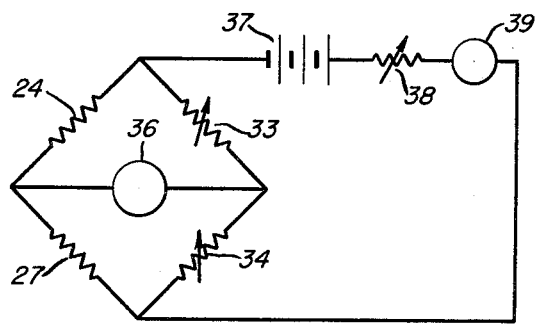
Fig. 3
Fig. 2
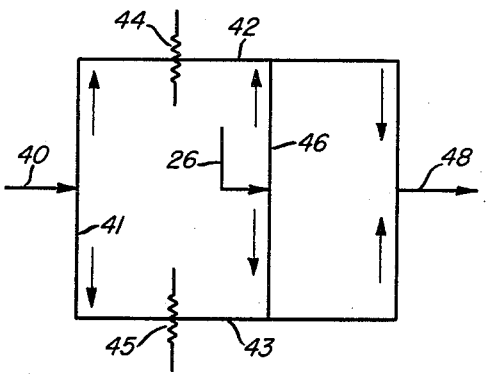
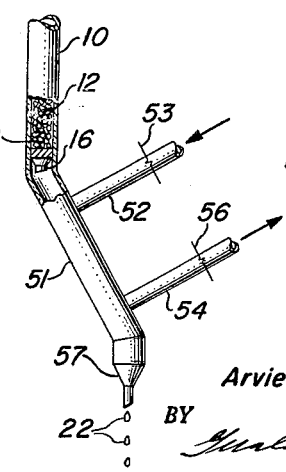
Fig. 4
INVENTOR.
Arvie Glenn Nerheim
BY
ATTORNEY

United States Patent Office 3,080,746
Patented Mar. 12, 1963

3,080,746
APPARATUS AND METHOD FOR TESTING LIQUIDS
Arvie Glenn Nerheim, Crown Point, Ind., assignor to Standard Oil Company, Chicago, Ill., a corporation of Indiana
Filed Oct. 27, 1959, Ser. No. 849,102
12 Claims. (Cl. 73—53)

This invention relates to method and means for analyzing liquids, and more particularly is concerned with a system for determining the composition of a stream of volatile liquid. The inventive system is of special utility as a composition detector for eluted liquids in liquid phase chromatography.

Liquid phase chromatography is a technique for resolving the components of a mixture of liquids or of a solution of solids in a liquid which involves passing the mixture through a suitable solid adsorbent. Adsorbents such as silica gel, ion exchange resins, paper, and string, among others, are used, and effect resolution of the components by retaining one or more of the components more tenaciously than other component. Consequently, components which are less tenaciously retained pass through a chromatographic adsorbent more rapidly than those which tend to adhere more to the adsorbent. By analyzing the liquid flowing from a chromatographic column, or by examining the column during analysis, it is possible to ascertain the separation achieved, and hence the composition of the original mixture.

A form of liquid phase chromatography which is now assuming increasing significance is liquid-solid chromatography. Two liquids are employed with a solid adsorbent. The first liquid is the mixture to be analyzed. The second, termed the "eluent," is a liquid which has a lower affinity for the adsorbent than do the components of the mixture. In liquid-solid chromatography, a long column having an inlet and an outlet is packed with adsorbent saturated with the eluent, and then a known quantity of the liquid mixture to be analyzed is introduced to the top of the column. Finally, an additional quantity of the eluent is placed atop the adsorbent and begins eluting the liquid mixture downward through the column. Those components of the mixture which are least strongly absorbed pass through most rapidly, while those more strongly adsorbed are delayed. Chemical or physical analysis of the eluted liquid streaming from the column outlet provides a quantitative determination of the liquid mixture composition.

Detectors for indicating or recording changes in the composition of liquids flowing from chromatographic columns in general, and liquid-solid chromatographic columns in particular, have been receiving much attention by workers in the field, as they are crucial to the success of chromatography. Unfortunately such detectors, in order to have rapid response, must be continuous. The cost, complicated construction, and delicacy of continuous refractometers, electrical conductivity meters, pH meters, and the like have thus far mitigated against more widespread use of liquid phase chromatography. Moreover, such continuous detectors must often rely on almost infinitesimal differences in physical properties, and hence tend to be unstable, and suited only for analyses where such differences exist.

Accordingly, a primary object of the present invention is to provide a detector for liquid phase chromatography which is extremely versatile, and capable of use for a wide variety of analyses and with a large number of eluents. A further object is to provide a detector which is extremely rugged, and simple to construct and operate. Yet another object is to furnish a chromatography detector which is extremely sensitive and accurate, yet which is stable in operation and largely free from base line drift. An additional object is to provide such detector at low construction and operating cost. Still another object is to provide a detector which, when coupled with a recorder device, can furnish a chromatogram which permits ready computation of the analysis. A major object is to provide a system for continuously determining changes in composition of a volatile liquid; not only in liquid-solid and liquid-liquid chromatography but for hydrocarbon quality control services. A general object is to provide an improved system for testing the volatility of a stream of liquid as an indication of its composition. Other and more particular objects will become apparent as the description of the invention proceeds.

Briefly, in accordance with the invention, there is provided a detector for testing the composition of a flowing stream, having an equilibrating or gas-liquid contact zone through which the stream is conducted and wherein a portion of the liquid is vaporized. The amount vaporized is dependent on the stream composition. An inert gas, continuously passed through the equilibrating zone, mixes with the vaporized portion of the stream and, as it leaves the equilibrating zone, passes through a detector which is sensitive to the now-changed gas composition. Since the amount of vapor which formed in the equilibrating zone is a function of liquid stream composition, the change in composition of the outlet gas is directly related to the composition of the flowing stream of liquid.

According to the preferred form of the invention, the equilibrating zone where liquid and vapor come to equilibrium comprises a vertically elongated chamber or tube, having a coaxial rod along which liquid flows by gravity. Inert gas such as nitrogen enters through an inlet tube into the upper portion of the chamber, flows concurrent with the liquid, and leaves through an outlet tube communicating with the lower portion of the chamber. The gas-plus-vapor composition detector is desirably one which is sensitive to a physical rather than chemical change in gas composition; detectors may be sensitive to thermal conductivity or gas density changes.

Further features and advantages of the inventive system will become apparent from a detailed description of the invention in the ensuing specification when read in conjunction with the attached drawings wherein:

FIGURE 1 is a sectional elevation of the preferred form of the inventive system as employed in liquid-solid chromatography;

FIGURE 2 is a schematic elevation of a gas density balance of improved type which I have recently developed and which may be used in the present system;

FIGURE 3 shows an electrical Wheatstone bridge circuit suitable for use with either a gas density balance or a thermal conductivity detector; and FIGURE 4 shows an alternative schematic elevation of the inventive system.

Turning first to FIGURE 1, the system comprises an equilibrating zone including elongated chamber 17, an axially aligned rod 18, and inert gas inlet and outlet tubes 23 and 26 respectively.

A liquid-solid chromatographic column 11, which is illustrative of the type of device to which the system may be applied, is disposed above chamber 17. Column 11 may be a glass tube about three feet long and one inch inside diameter, packed with silica gel particles 12 of 26–200 mesh size range. An inlet section 10 of column 11 is left unpacked to facilitate the addition of eluent and liquid sample mixture. A necked outlet 16 is provided at the bottom end of column 11 and is plugged with a porous material 14 such as glass wool to permit easy flow of liquid yet prevent loss of silica gel 11.

A wide variety of adsorbents, eluents, and liquid mixtures may be processed by various forms of liquid chromatography, and a special advantage of the invention is that it is useful in most of the analyses of interest. By way of example, adsorbents such as silica gel, alumina, and anion and cation exchange resins may be employed; eluents such as water, ethanol, water-saturated butanol, etc., can be used; and mixtures such as isooctane-ethylene glycol, glycerol-ethylene glycol, butanol-propanol, acetone-acetic acid, and heavier materials up to and including inorganic salts can be resolved by means of appropriate adsorbents.

Chamber 17, which defines the zone wherein liquid flowing from outlet 16 is partially vaporized, is in vapor-tight contact with column 11. Chamber 17 may be a tube made of glass or metal, about 2" long by ¼" I.D. Rod 18, which may similarly be of glass or metal, is supported in chamber 17 by brackets, not shown, and may be a solid rod, ⅛" in diameter, extending from and contacting outlet 16 and ending in a porous plug 19, of fiberglass, etc. Plug 19 permits liquid 22 to flow slowly and gradually out of outlet port 21 in chamber 17 and avoids pressure surges.

Chamber 17 is maintained at constant temperature by being surrounded with insulating material 15. For the highest degree of accuracy, thermostating by means of electrical heating wire or a water bath may be employed. An inert gas inlet tube 23 communicates into chamber 17 and admits a constant flow of a gas which is chemically nonreactive with the liquid from column 11 and with elements 24 and 27, to be described presently. This gas may be, for example, nitrogen, air, methane, helium, hydrogen, etc., depending on convenience and availability.

As applied to a typical liquid-liquid chromatographic analysis, an eluent such as 95% aqueous ethanol is initially added to column 11 and flows, at constant rate, into chamber 17 where it travels as a thin film down rod 18. A small portion, say ⅒, of the liquid is vaporized and mixes with the inert gas, passing out of chamber through outlet tube or conduit 26.

If no material other than the 95% aqueous ethanol is in the liquid, then gas in outlet tube 26 is in a dynamic equilibrium with the liquid leaving through outlet port 21. However, if a component of the sample liquid having a volatility different from that of 95% ethanol (or which forms an azeotrope having a different volatility) enters chamber 17, then the amount of liquid which vaporizes will change, being either more or less depending on whether the new component is less or more volatile than 95% ethanol at chamber 17 temperature. For example, if a relatively nonvolatile material such as ethylene glycol enters, then the volatility will decrease. This decrease will be approximately in accordance with Raoults law, which says that vapor pressure will decrease in proportion to the concentration of a nonvolatile material present. As a consequence, the amount of vapor which passes into the inert gas stream will decrease in proportion to the concentration of ethylene glycol in the 95% ethanol. Conversely, if a liquid more volatile than the 95% ethanol, say acetone, or one which forms a low-boiling azeotrope with ethanol or water, enters chamber 17, the amount of vapor which is formed will be increased.

To detect the change in composition of the inert gas caused by the presence of an additional material in liquid coming from chromatography column 11, a detector is provided which is sensitive to such change. Many detectors are known, but those operating on the thermal conductvity principle or on the gas density balance principle are preferred by reason of their sensitivity and ruggedness.

FIGURE 1 shows an installation of a thermal conductivity cell comprising elements 24 and 27 located in gas inlet and outlet tubes 23 and 26, respectively. These elements are electrically heated, temperature sensitive, electrical elements such as plantinum or tungsten lamp filaments or thermistor beads. They are heated by an electrical current. When a gas flows over a filament it tends to cool the filament, thereby changing its resistance. When the thermal conductivity of the gas increases (or decreases) as the result of an additional component being added it will tend to conduct away more (less) heat and accordingly cool (heat) the filament. The change in resistance of the filament is measured electrically and provides an indication of the change in gas composition. To make the elements insensitive to flow rate, barriers 28 and 29 may be disposed upstream and downstream of element 27 (and 24) so that cooling of the filament 27 is caused only by gases which diffuse to and from the filament.

Referring to FIGURE 3, a suitable Wheatstone bridge circuit is shown which may be used to measure this change in resistance of elements 24 and 27. Resistors 33 and 34 are in adjoining arms of the bridge, and an indicator or recorder 36 indicates the bridge imbalance. Current for the bridge, which also heats elements 24 and 27, is supplied by battery 37 and is adjusted by means of potentiometer 38 and ammeter 39.

Turning now to FIGURE 2, an alternative detector is schematically shown which is sensitive to density changes of the gas in tube 26. This particular balance was recently developed by me (S.N. 682,036). It operates on the principle that if a reference gas is flowing in two vertically displaced reference gas flow conduits, and a third tube communicates between the flow conduits, then a sample gas having a density different from that of the reference gas introduced into the third conduit will tend to flow toward one of the reference gas flow conduits and produce a detectable change in the reference gas flow.

FIGURE 2 schematically embodies such a device. Reference gas such as nitrogen is introduced via tube 40 into manifold chamber 41. The flow splits, passing through reference gas flow tubes 42 and 43, one above the other, and leaves through a flow restrictive outlet 48. Temperature sensitive electrically heated elements 44 and 45 are disposed in each of the reference gas flow tubes, and by means of a bridge arrangement similar to that of FIGURE 3 indicate the relative flowrates through tubes 42 and 43. Sample gas (from chamber 17 in FIGURE 1) enters the balance through tube 26 and passes into sample tube 46. The disruption in flow of reference gas in tubes 42 and 43 which the sample gas produces is sensed by elements 44 and 45 as a measure of sample gas density, and hence composition. Thus it also is an indication of the composition of liquid streaming into chamber 17 (FIGURE 1).

Directing attention to FIGURE 4, another construction of the inventive system is depicted. In this embodiment the equilibrating or gas-liquid contact zone comprises an inclined tube 51, along which eluted liquid from chromatographic column 10 flows. In tube 51 the descending liquid is contacted by a stream of inert gas entering via conduit 52 (and passing over detector element 53 corresponding to element 24 in FIGURE 1). The resultant gas and vapor leave through conduit 54 and pass over element 56 (corresponding to element 27 of FIGURE 1). Liquid is discharged from the equilibrating zone through outlet port 57.

Whatever gas composition detector is employed, the output will normally be recorded on a strip chart as a chromatogram of the liquid sample. The chromatogram will consist of a straight line representing the flow of eluent only into equilibrating chamber 17 (FIGURE 1), interrupted by a peak (or trough) for each eluted component of the mixture being chromatogramed. The integral of each peak (or trough) is proportional to the concentration of the component in the original mixture. Such concentration may be determined by integrating each peak and multiplying peak area by a suitable predetermined proportionality constant to obtain its concentration in the mixture.

While two specific embodiments of the system have been described in great detail, it is evident that many modifications, variations, improvements, etc., may be made therein. For example, instead of a vertical chamber 17 and rod 18, a simple inclined tube may be used. Also, helium, when available, may be employed as an inert gas. Other modifications will suggest themselves without departing from the spirit and broad scope of the invention.

I claim:
1. A liquid phase chromatography system comprising in combination:
   a liquid phase chromatography column having an outlet for eluted liquid;
   a gas-liquid contact zone communicating with said outlet for continuously vaporizing a portion of the liquid, said gas-liquid contact zone comprising a vertical tube and a coaxial rod along which the eluted liquid flows by gravity as a thin film;
   a gas inlet to said gas-liquid contact zone;
   a gas outlet from said gas-liquid contact zone;
   and detector means for determining changes in composition of the gas due to partial vaporization of the eluted liquid as a measure of eluted liquid composition.

2. A liquid phase chromatography system comprising in combination:
   a liquid phase chromatography column having an outlet for eluted liquid;
   a gas-liquid contact zone communicating with said outlet for continuously vaporizing a portion of the liquid;
   a gas inlet to said gas-liquid contact zone;
   a gas outlet from said zone;
   and detector means for determining changes in composition of the outlet gas due to partial vaporization of the said liquid as a measure of eluted liquid composition, said detector means comprising a gas density balance having a pair of vertically displaced upper and lower reference gas flow conduits, a flow restrictive outlet means from said reference gas flow conduits, a substantially vertical sample tube disposed between and in flow communication with said reference gas flow conduits, a conduit for introducing outlet gas to said sample tube, and detector means for determining differentials in rates of flow of reference gas in said flow conduits due to changes in flow of outlet gas in said sample tube toward one of said conduits as a measure of outlet gas composition.

3. An apparatus for liquid-liquid and liquid-solid chromatography which comprises:
   a liquid phase chromatography column:
   an elongated chamber communicating with said column through which eluted liquid flows as a thin film and wherein a portion of the eluted liquid vaporizes, said chamber being a tube having an axially aligned elongated member along which the eluted liquid flows by gravity as a thin film;
   a gas inlet tube communicating with an upper portion of the chamber for flowing an inert gas into said chamber;
   a gas outlet tube communicating with a lower portion of the chamber;
   and detector means for determining the change in composition of gas in the outlet tube with respect to gas in the inlet tube due to partial vaporization of the eluted liquid as a measure of eluted liquid composition.

4. A liquid phase chromatography system comprising:
   a liquid phase chromatography column having an inlet for an eluent and a sample mixture and an outlet for eluted liquid, said sample mixture having at least one component of a volatility different from that of the eluent;
   a gas-liquid contact zone communicating with said outlet wherein said eluted liquid is spread into a thin film and wherein a portion of said eluted liquid vaporizes;
   means for passing a gas through said gas-liquid contact zone whereby said gas mixes with vaporized liquid;
   and means for determining changes in composition of gas leaving said gas-liquid contact zone as a measure of eluted liquid composition.

5. System of claim 4 wherein said gas-liquid contact zone comprises a vertical tube, with a coaxial rod along which the eluted liquid flows by gravity as a thin film.

6. System of claim 4 wherein said gas-liquid contact zone comprises an inclined tube.

7. System of claim 4 wherein said means for determining changes in composition of gas comprises a thermal conductivity detector having an electrically heated temperature sensitive resistance element in each of the gas streams before and after passage through said gas-liquid contact zone, and an electrical bridge circuit for said elements.

8. System of claim 4 wherein said detector means comprises a gas-density balance.

9. System of claim 8 wherein said gas density balance has a pair of vertically displaced upper and lower reference gas flow conduits, a flow restrictive outlet means from said reference gas flow conduits, a substantially vertical sample tube disposed between and in flow communication with said reference gas flow conduits, a conduit for introducing gas leaving said gas-liquid contact zone into said sample tube, and detector means for determining differentials in rates of flow of reference gas in said flow conduits due to changes in flow of gas in said sample tube toward one of said conduits as a measure of gas composition.

10. System of claim 4 including means for maintaining said gas-liquid contact zone at constant temperature.

11. System of claim 4 including means for recording the output of said means for determing changes in composition.

12. A method of analyzing a liquid eluted from a liquid phase chromatography column, which liquid comprises an eluent having a volatility different from that of sample components resolved by such liquid phase chromatography column, which method comprises:
   passing the eluted liquid as a thin film in contact with a stream of gas and permitting a portion of said eluted liquid to vaporize into said stream of gas;
   and determining changes in composition of the stream of gas resulting from such vaporization as a measure of eluted liquid composition.

References Cited in the file of this patent
UNITED STATES PATENTS

| 2,671,343 | Jacobs et al. | Mar. 9, 1954 |
| 2,692,820 | Alway et al. | Oct. 26, 1954 |
| 2,728,219 | Martin | Dec. 27, 1955 |

OTHER REFERENCES

Article entitled "A Thermal Conductivity Gauge for Use in Gas-Liquid Partition Chromatography"; by D. Ambrose et al.; from Journal of Scientific Instruments; page 323, vol. 32, August 1955.